(12) United States Patent
Freidin (10) Patent No.: US 8,467,900 B2
(45) Date of Patent: Jun. 18, 2013

(54) DISPENSE VERIFICATION METERS

(75) Inventor: Philip M. Freidin, Sunnyvale, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 0 days.

(21) Appl. No.: 13/461,638

(22) Filed: May 1, 2012

(65) Prior Publication Data

US 2012/0211518 A1  Aug. 23, 2012

Related U.S. Application Data

(62) Division of application No. 11/966,228, filed on Dec. 28, 2007, now Pat. No. 8,185,237.

(51) Int. Cl.
*G06F 17/00* (2006.01)

(52) U.S. Cl.
USPC ............ 700/244; 700/240; 700/236; 700/231

(58) Field of Classification Search
USPC .................................. 700/231, 232, 236, 240
See application file for complete search history.

(56) References Cited

U.S. PATENT DOCUMENTS

| | | | |
|---|---|---|---|
| 3,575,050 A | 4/1971 | Lynnworth | |
| 3,958,443 A | 5/1976 | Berrettini | |
| 4,384,925 A | 5/1983 | Stetter et al. | |
| 4,454,767 A | 6/1984 | Shinkai et al. | |
| 4,474,309 A * | 10/1984 | Solomon | 222/1 |
| 4,483,202 A | 11/1984 | Ogura et al. | |
| 5,056,036 A * | 10/1991 | Van Bork | 700/282 |
| 5,139,044 A * | 8/1992 | Otten et al. | 137/80 |
| 5,249,932 A * | 10/1993 | Van Bork | 417/386 |
| 5,458,004 A | 10/1995 | Van der Pol | |
| 5,755,218 A | 5/1998 | Johansson et al. | |
| 5,831,175 A | 11/1998 | Fletcher-Haynes | |
| 5,974,897 A | 11/1999 | Koyano et al. | |
| 6,055,868 A | 5/2000 | Koyano et al. | |
| 6,357,300 B1 | 3/2002 | Johnson et al. | |
| 6,490,933 B2 * | 12/2002 | Koyano et al. | 73/861.27 |
| D495,615 S | 9/2004 | King et al. | |
| 6,925,397 B2 | 8/2005 | Rogers et al. | |
| 7,117,104 B2 | 10/2006 | Urdaneta et al. | |
| 7,181,361 B2 * | 2/2007 | Memmott et al. | 702/130 |
| 2002/0089561 A1 * | 7/2002 | Weitzel et al. | 347/19 |
| 2006/0089749 A1 * | 4/2006 | Arnold et al. | 700/231 |
| 2007/0034016 A1 | 2/2007 | Maginnis et al. | |
| 2007/0056351 A1 | 3/2007 | Curtis et al. | |
| 2007/0254094 A1 * | 11/2007 | Lin | 427/8 |

FOREIGN PATENT DOCUMENTS

WO   WO 98/24722   6/1998

OTHER PUBLICATIONS

"Beverage Dispensing Flow Meter on GlobalSpec," 1999-2007, GlobalSpec, [online] [Retrieved on Dec. 31, 2007] Retrieved from the Internet<URL:http://process-equipment.globalspec.com/Industrial-Directory/beverage_dispensing_flow_meter.>.

(Continued)

*Primary Examiner* — Michael K Collins
(74) *Attorney, Agent, or Firm* — Fenwick & West LLP (57) ABSTRACT

A dispense verification meter for measuring and verifying dispense operations (e.g., actual dispensed volumes) of media dispense systems. The dispense verification meter preferably automatically corrects zero offset drift, preferably samples the flow rate of media being dispensed at a sufficiently high sample rate, and verifies whether the desired dispense operation has been achieved.

20 Claims, 7 Drawing Sheets

OTHER PUBLICATIONS

"Fluid Dispensing Equipment Information on GlobalSpec," 1999-2007, GlobalSpec, [online] [Retrieved on Dec. 31, 2007] Retrieved from the Internet<URL:http://process-equipment.globalspec.com/LearnMore/Manufacturing_Process_Equipment/Industrial_Assembly/Fluid_Dispensing_Systems.>.

"Omni Flow Computer, Flow Conditioning, Communicating with Micro Motion Mass Meters," 2003, Omni Flow Computers, Inc., [online] [Retrieved on Dec. 31, 2007] Retrieved from the Internet<URL:http://www.omniflow.com/newsletters/volume1/number3.html.>.

PCT International Search Report and Written Opinion, PCT Application No. PCT US2008/086892, Feb. 10, 2009, nine pages.

\* cited by examiner

DISPENSE VERIFICATION METERS

CROSS REFERENCE TO RELATED APPLICATIONS

This application is a divisional of U.S. patent application Ser. No. 11/966,228, filed Dec. 28, 2007, which is herein incorporated by reference in its entirety.

BACKGROUND

1. Field of Disclosure

The present invention relates to the dispensing of media and, more specifically, to the verification of dispense operations.

2. Description of Related Art

In various fields there is a need for accurate dispensing of gases, fluids, and slurries (collectively, "media"). Often the dispensing is repetitive. For example, in the semiconductor industry, the manufacture of silicon chips involves multiple complex processing steps where various media are applied to semiconductor wafers to perform various tasks such as photomasking, etching, polishing, cleaning, and chemically modifying the wafers. These processing steps depend on dispensing accurate volumes of the media. As another example, in the biopharmaceutical industry, the manufacture of drugs and test products (e.g., blood test strips) frequently requires dispensing accurate volumes of media.

Dispense pumps are frequently used to control accurate dispensing of media. For example, one can control the dispense operation of a diaphragm pump by controlling the distance that the pump's diaphragm moves and the precise opening and closing time of the pump's valves. However, accurate control of the pump alone may not necessarily lead to accurate dispensing. Other factors also affect the dispense accuracy of a pump system. For example, pump systems are susceptible to various characteristics of the surrounding environment that can modify how much media is actually dispensed. These environmental factors include the pressure of the media at the inlet side of the pump, the accuracy of the timing signals used to control the pump's operation, the pressure of the environment in to which the media is dispensed, the viscosity of the media being dispensed, and the resistance to media flow of the tubing used on both the inlet and outlet side of the pump. Dispense systems may also behave unreliably if there are bubbles in the media, if there are blockages in the system, or if the source media is all consumed (e.g., the source vessel runs empty). Another factor that may affect the accuracy of dispense pumps is that contaminants in the media may damage the valve surfaces, or interfere with the correct opening and closing of the valves. In addition, dispense pumps are usually unable to verify that the correct volume is delivered under the various situations where environmental factors interfere with accurate delivery.

Similar to dispense pumps, the accuracy of systems and devices used to measure volumes or flow rates of media is also susceptible to environmental factors such as the temperature and pressure of the media, humidity, light level, system power level, aging of the measurement systems, and other environmental factors or changes. Therefore, the measurement devices used in dispense systems can be affected. For example, over time, the zero offset error value of the measurement may drift away from an initially calculated value (hereinafter, "zero offset drift"). Users of these measurement devices may recalculate the zero offset error to account for the zero offset drift. Typically zero offset error calculation is done by the measurement device, but it needs an input that indicates that the actual flow rate is zero. This indication may be a button/switch that the user activates when the flow rate is known to be zero. This process is inefficient and subject to human errors.

Therefore, there is a need for a measurement device for verifying the actual dispensed volume of a dispense system. There is also a need for a system and method for automatically correcting the zero offset drift for the measurement device.

SUMMARY

The present invention provides a dispense verification meter for measuring and verifying dispense operations (e.g., actual dispensed volumes) of media. The dispense verification meter preferably automatically corrects zero offset drift, preferably samples the flow rate of media being dispensed at a sufficiently high sample rate, and verifies whether the desired dispense operation has been achieved.

In one aspect, a dispense verification meter automatically corrects zero offset drift. The dispense verification meter repeatedly measures the idle flow rate during the idle period between dispense operations. The dispense verification meter calculates an average of these measurements, determines a zero offset drift, and compensates subsequent flow rate measurements based on the determined zero offset drift.

In another aspect, a dispense verification meter verifies dispense operations. The dispense verification meter receives a descriptor for a desired dispense operation. It measures flow rates of the media multiple times over the course of the dispense operation and calculates a dispense volume of the media based on the multiple flow rate measurements. The dispense verification meter verifies the dispense operation based on the calculated dispense volume.

In yet another aspect, a dispense system includes a media dispense line, a dispense pump, a dispense verification meter and a control system. The dispense verification meter further includes a flow meter and an embedded controller. The dispense pump pumps media through the media dispense line. The dispense verification meter receives a descriptor for a desired dispense operation. It measures an idle flow rate of the media during an idle period and also measures flow rates of the media multiple times over the course of the dispense operation. The dispense verification meter calculates a dispensed volume of the media based on the multiple flow rate measurements and the idle flow rate measurement(s). It verifies the dispense operation based on the calculated dispensed volume.

Other aspects include software, systems, components, and methods corresponding to the above, and applications of the above for other purposes.

BRIEF DESCRIPTION OF THE DRAWINGS

The disclosure is illustrated by way of example, and not by way of limitation, in the figures of the accompanying drawings in which like reference numerals refer to similar elements.

DETAILED DESCRIPTION

The following disclosure and accompanying drawings describe a dispense verification meter (and corresponding method, system, and computer program product) for measuring and verifying dispense operations of media dispense systems. The dispense verification meter measures the flow rate of the dispensed media during a dispense operation, and calculates and verifies an actual dispensed volume of the dispense operation. Approaches for the dispense verification meter to automatically correct zero offset drift are also disclosed. The dispense verification meter measures the flow rate during an idle period between dispense operations, and uses the measurement to correct zero offset drift.

In the following disclosure, substances being dispensed, such as gas, fluid (e.g., liquid, semisolid, and sludge), solid (e.g., loose granular material such as sand), or a mixture of any of these (e.g., watery mixtures of insoluble matter such as slurry), are collectively called media.

Dispense System

Figure 1:
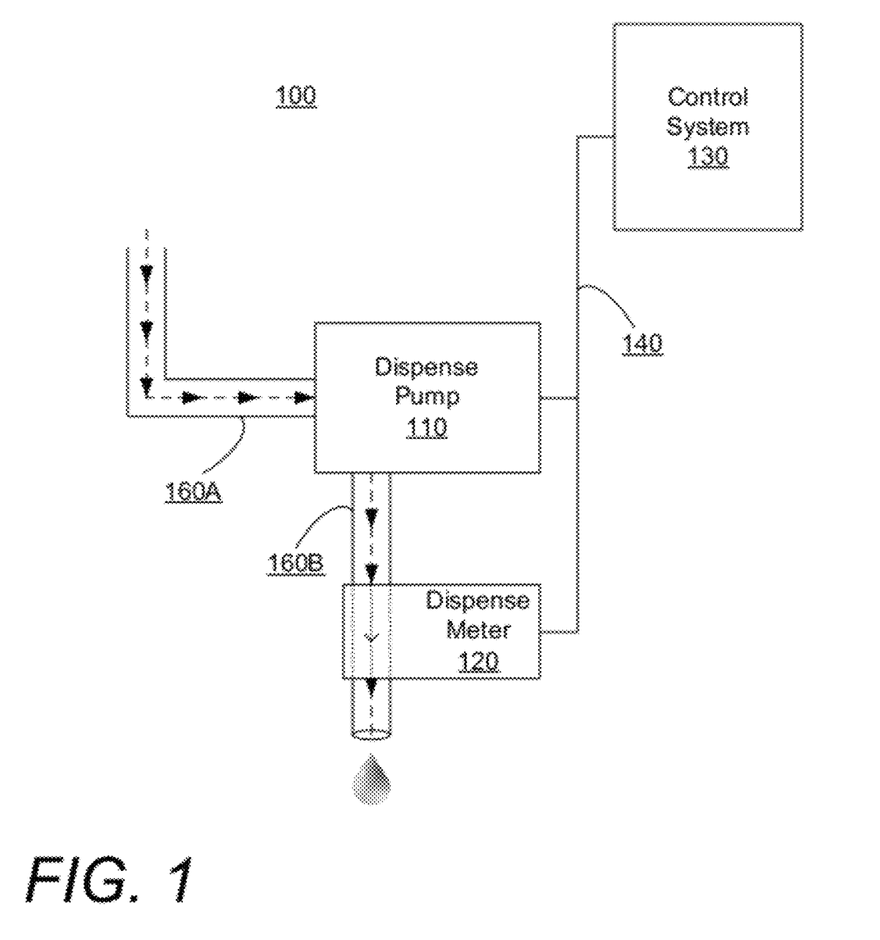
FIG. 1 is a diagram illustrating a dispense system according to one embodiment of the present disclosure.

FIG. 1 is a diagram illustrating an architecture of a metered media dispense system 100 according to one embodiment of the present disclosure. The dispense system 100 includes a dispense pump 110, a dispense verification meter 120, a media dispense line 160 and a control system 130. The dispense pump 110 and the dispense verification meter 120 are connected to the dispense line 160. The dispense pump 110 and the dispense verification meter 120 are also communicatively connected to control system 130, in this example via interconnect 140. The dispense system 100 provides accurate and repetitive dispensing of media.

The dispense pump 110 dispenses a specific amount of media in a repetitive manner controlled by the control system 130. In one embodiment, the dispense pump 110 receives dispense signals (i.e., trigger signals) from the control system 130, and carries out dispense operations based on the dispense signals (e.g., when to start and/or when to finish). The dispense pump 110 typically has a supply vessel 160A (or source vessel or entrance) from which the media is drawn or provided, and a dispense vessel 160B (or destination vessel or outlet port or exit) through which the media is dispensed or released or delivered. For convenience, the supply vessel, dispense vessel and interconnecting lines will simply be referred to as media dispense lines 160.

The dispense pump 110 can use a variety of technologies to control the drawing and/or the dispensing of the media. For example, an outlet of the dispense pump 110 may include a valve that is controlled by the control system 130. To dispense the media, the valve is opened for a controlled period, and the media is dispensed through the outlet into the dispense vessel 160B. Examples of the dispense pump 110 include peristaltic pumps, diaphragm pumps, syringe pumps, pressure and valve pumps, and cartridge, pressure, and valve pumps.

The dispense verification meter 120 measures the flow rate of the media distributed by the dispense pump 110 and verifies the dispense operations (i.e., whether the volume dispensed is within a permissible range), for example based on descriptors of the desired dispense operation received from the control system 130 or manually entered into the dispense verification meter 120. In one embodiment, the dispense verification meter 120 is located proximate to the dispense vessel 160B, measures the flow rate of the media flowing through the dispense vessel 160B, and calculates the dispensed volumes based on the measurements (e.g., by numerical integration). The dispense verification meter 120 receives control signals from the control system 130.

In one embodiment, the dispense verification meter 120 includes a flowmeter and an embedded controller. The dispense verification meter 120 receives trigger signals from the control system 130. These may be the same as the dispense signals that the control system 130 transmits to the dispense pump 110 for initiating dispense operations. Examples of trigger signals are described in detail below with respect to FIGS. 4A through 4D. The dispense verification meter 120 outputs to the control system a verification result (i.e., whether or not the dispensed volume was within a permissible range as defined by descriptors received from the control system, or entered manually into the dispense verification meter 120). In one embodiment, the dispense verification meter 120 may automatically correct zero offset drift based on measurements made during an idle period between dispense operations. Examples of flowmeters within the dispense verification meter 120 include ultrasonic flowmeters, turbine/paddle wheel flowmeters, differential pressure flowmeters, gear flowmeters, positive displacement flowmeters, electromagnetic flowmeters, doppler flowmeters, vortex flowmeters, thermal mass flowmeters, and coriolis flowmeters.

The control system 130 directs the dispense pump 110 when to dispense the media, and transmits control signals to the dispense verification meter 120 indicating the timing of the dispense operations. In one embodiment, the control system 130 includes a general purpose computer, a Programmable Logic Controller (PLC), or an integrated circuit. The control system 130 issues dispense signals to the dispense pump 110 (e.g., turns the dispense pump 110 on for 200 ms) and to the dispense verification meter 120. In one embodiment, the control system 130 receives measured data from the dispense verification meter 120 and optionally modifies a signal (e.g., the time and duration of a dispense signal) subsequently sent to the dispense pump 110. In this way, the measurements carried out by the dispense verification meter 120 may affect the volume of media subsequently dispensed. In another embodiment, the control system 130 receives measured data and/or verification results from the dispense verification meter 120 and outputs them for storage or for users to perceive (e.g., display the verification results on a screen).

Figure 2:
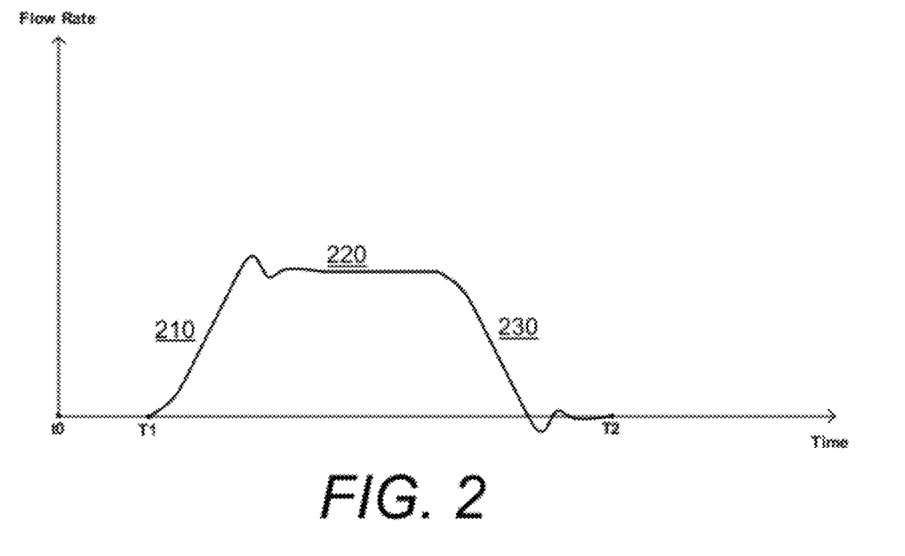
FIG. 2 is a time-series graph illustrating the flow rate of media dispensed over the course of a dispense operation.

The interconnect 140 is configured to communicatively connect the dispense pump 110, the dispense verification meter 120, and the control system 130. The interconnect 140 may be as simple as a wire or a more sophisticated wired or wireless network. Examples of the network include CANBus, FieldBus, MODBus, ProfiBus, the Internet, an intranet, a WiFi network, a WiMAX network, a mobile telephone network, or a combination thereof Flow Rate During a Dispense Operation FIG. 2 is a time-series graph illustrating the flow rate of media dispensed through the dispense vessel 160 over the course of a typical dispense operation. As illustrated, the typical dispensing includes a period of time during which dispense is not taking place (between T0 and T1, also known as the "initial idle phase"), a period of time during which the dispense operation takes place (between T1 and T2, also known as the "dispense phase"), and a period of time after the dispense operation during which no media flow occurs (after T2, also known as the "subsequent idle phase"). During the idle phases, the flow rate is zero. During the dispense phase, the media is dispensed through the media dispense line 160 and the flow rate generally is not zero.

As indicated in FIG. 2, within the dispense phase (between T1 and T2), there is a start ramp 210 when the dispense pump 110 and flow rate go from idle to full speed and a stop ramp 230 when the dispense pump 110 and flow rate go from full speed to idle. During these two ramps 210, 230, the flow rate changes significantly. There may be a stable period 220 between the two ramps 210, 230, or the flow rate may vary during the period 220. During the period 220, the dispense pump 110 operates at full speed and the flow rate is typically constant. Notice that, in this example, the flow rate changes in a non-linear fashion within the start ramp 210 and the stop ramp 230. There are overshoot fluctuations at the transition from the start ramp 210 to the period 220 and also at the transition from stop ramp 230 to the subsequent idle phase. This is caused by factors such as pump structure and other environmental effects such as cavitation.

In one embodiment, the control system 130 issues the dispense signal at T1. The dispense pump 110 may immediately initiate the dispense operation at T1, as illustrated in FIG. 2. Alternatively, the dispense operation may occur after a delay. For example, the control system 130 might issue the dispense signal before T1, with the dispense pump 110 delaying by a predetermined time period before starting the dispense. During the delay, no media flow occurs. Examples of the timing of dispense operations and measurements are described in more detail below with respect to FIGS. 4A through 4D.

Measurement and Calculation for a Dispense Operation

Because the volume of media delivered by the dispense pump 110 is affected by pumping duration, media pressure, pump speed, and various other characteristics and factors, depending on the type of the dispense pump 110, it can be complicated and inaccurate for the control system 130 to calculate the volume of media dispensed based solely on information sent to or received from the dispense pump 110. Therefore, it is usually desirable for the dispense verification meter 120 to calculate the volume dispensed, typically based on the flow rate of the dispensed media as measured over the course of the dispense operation.

Figure 3:
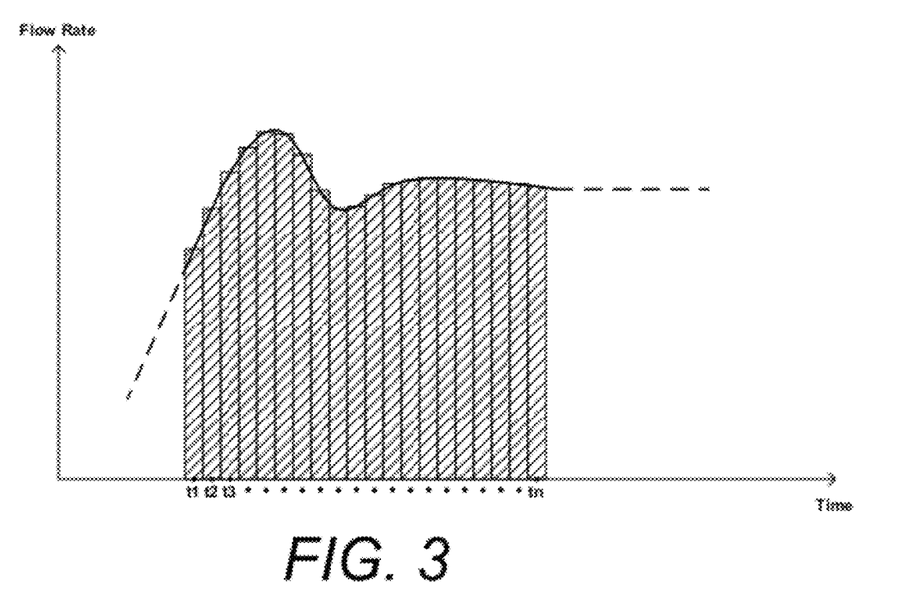
FIG. 3 is a time-series graph illustrating a portion of the flow rate illustrated in FIG. 2 and measurements of the flow rate made during the same period of time according to one embodiment of the present disclosure.

As illustrated in FIG. 3, the dispense verification meter 120 may determine the volume of the media dispensed during a dispense operation by periodically measuring the flow rate and calculating the integral (or totalization) of flow rate measurements taken over the course of the dispense operation. FIG. 3 is a time-series graph illustrating a portion of the flow rate illustrated in FIG. 2, and also illustrating measurements of the flow rate made during the same period of time.

As illustrated in FIG. 3, the dispense verification meter 120 measures the flow rate of the media through the media dispense lines 160 during the dispense phase. In one embodiment, the dispense verification meter 120 starts measuring the flow rate immediately after receiving a dispense signal from the control system 130. For example, the dispense verification meter 120 measures the flow rate at t1, t2, t3, . . . . , tn. As detailed below with respect to FIGS. 4A through 4D, the dispense verification meter 120 may measure the flow rate during the dispense phase in different dispense timing scenarios. In one embodiment, the dispense verification meter 120 measures flow rate continuously, including before, during, and after the dispense operation.

As illustrated in FIGS. 2 and 3, the actual flow rate during the dispense operation changes over time. During both the start ramp 210 and the stop ramp 230, the pump will be either speeding up or slowing down, thus leading to an increasing or decreasing ramp in flow rate. The flow rate may also fluctuate because of effects such as cavitation. The volume of the dispensed media equals the integral of the flow rate over the duration of the dispense phase. Therefore, the size of the area under the curve of the flow rate in FIG. 2 equals the dispensed volume. The dispense verification meter 120 may estimate the volume by numerically integrating the flow rate measurements taken over the dispense phase (e.g., by Riemann integral, as illustrated in FIG. 3 by the bars filled with stripe patterns).

In one embodiment, the dispense verification meter 120 samples the flow rate at a high enough frequency to accurately measure the actual flow rate change during the dispense phase. For example, the dispense verification meter 120 may take flow rate measurements at a frequency that is higher than the native sampling frequency (Nyquist frequency) of the highest frequency component of flow rate during the dispense operation. This leads to a more accurate calculation of the dispensed volume. In one embodiment, the measurements are taken at a same frequency (e.g., with the same time interval between measurements). Alternatively, the dispense verification meter 120 may alter the measurement frequency over the course of a dispense operation. For example, it may sample less frequently when the flow rate is stable and sample more frequently when the flow rate is changing more rapidly. In one embodiment, the dispense verification meter 120 integrates the measured flow rates as the measurements are being taken. Alternatively, the dispense verification meter 120 may collect all of the measurements first and then numerically integrate them after the dispense phase is over.

Zero Offset Drift Correction

As described above, environmental factors (e.g., temperature and pressure of the media, ambient temperature, humidity, light level, system power level, aging of the measurement system) may cause zero offset drift of the dispense verification meter 120. For example, as the temperature of the dispense system 100 increases, a zero offset of the dispense verification meter 120 may drift away from its initially calculated zero offset. This zero offset drift directly affects the dispense verification meter 120's measurement accuracy, and therefore affects the accuracy of the calculated dispensed volume.

The detrimental effect of the zero offset drift is illustrated in the following example. In this example, the dispense verification meter 120 is based on a flow meter that takes 100 flow rate measurements per second (1 measurement every 10 ms). The meter range is 0 to 100 ml/(10 ms). The dispense pump 110 takes 50 ms to ramp up from idle to full speed, and 50 ms to ramp down from full speed to idle. The flow rate at full speed is 20 ml/(10 ms). The control system 130 issues a dispense signal that turns the pump on for 200 ms at time 0.

Table I below illustrates the effect of zero offset drift. Columns 2 and 3 of Table I show the actual flow rate at various times, and the corresponding integration total (i.e., dispensed volume). As shown, 400 ml of media is dispensed during the measured dispense operation.

| Time (ms) | Actual flow rate (ml/(10 ms)) | Actual dispensed volume (ml) | Measured flow rate (ml/(10 ms)) | Integrated dispensed volume (ml) |
|---|---|---|---|---|
| −50 | 0 | 0 | 0.2 | 0 |
| −40 | 0 | 0 | 0.2 | 0 |

-continued

| Time (ms) | Actual flow rate (ml/(10 ms)) | Actual dispensed volume (ml) | Measured flow rate (ml/(10 ms)) | Integrated dispensed volume (ml) |
|---|---|---|---|---|
| −30 | 0 | 0 | 0.2 | 0 |
| −20 | 0 | 0 | 0.2 | 0 |
| −10 | 0 | 0 | 0.2 | 0 |
| 0 | 0 | 0 | 0.2 | 0.2 |
| 10 | 4 | 4 | 4.2 | 4.4 |
| 20 | 8 | 12 | 8.2 | 12.6 |
| 30 | 12 | 24 | 12.2 | 24.8 |
| 40 | 16 | 40 | 16.2 | 41 |
| 50 | 20 | 60 | 20.2 | 61.2 |
| 60 | 20 | 80 | 20.2 | 81.4 |
| 70 | 20 | 100 | 20.2 | 101.6 |
| 80 | 20 | 120 | 20.2 | 121.8 |
| 90 | 20 | 140 | 20.2 | 142 |
| 100 | 20 | 160 | 20.2 | 162.2 |
| 110 | 20 | 180 | 20.2 | 182.4 |
| 120 | 20 | 200 | 20.2 | 202.6 |
| 130 | 20 | 220 | 20.2 | 222.8 |
| 140 | 20 | 240 | 20.2 | 243 |
| 150 | 20 | 260 | 20.2 | 263.2 |
| 160 | 20 | 280 | 20.2 | 283.4 |
| 170 | 20 | 300 | 20.2 | 303.6 |
| 180 | 20 | 320 | 20.2 | 323.8 |
| 190 | 20 | 340 | 20.2 | 344 |
| 200 | 20 | 360 | 20.2 | 364.2 |
| 210 | 16 | 376 | 16.2 | 380.4 |
| 220 | 12 | 388 | 12.2 | 392.6 |
| 230 | 8 | 396 | 8.2 | 400.8 |
| 240 | 4 | 400 | 4.2 | 405 |
| 250 | 0 | 400 | 0.2 | 405.2 |
| 260 | 0 | 400 | 0.2 | 405.4 |
| 270 | 0 | 400 | 0.2 | 405.6 |
| 280 | 0 | 400 | 0.2 | 405.8 |
| 290 | 0 | 400 | 0.2 | 406 |
| 300 | 0 | 400 | 0.2 | 406.2 |
| 310 | 0 | 400 | 0.2 | 406.4 |
| 320 | 0 | 400 | 0.2 | 406.6 |

Columns 4 and 5 show the measured flow rate, where the dispense verification meter 120 has an uncorrected zero offset drift of 0.2 ml/(10 ms), and the corresponding estimated dispensed volume. The zero offset drift causes the dispense verification meter 120 to calculate a dispensed volume of 406.6 ml, which is 6.6 ml more than the actual dispensed volume of 400 ml.

Because the dispense system 100 dispenses media only during dispense operations, there is zero actual flow during the idle time between dispense operations. If the dispense operations are triggered by dispense signals, the actual flow immediately prior to the dispense signal is zero. Therefore, whatever the measured flow rate just prior to the dispense operation is, the dispense verification meter 120 can determine that it is actually a measure of the zero offset drift, an offset error. In Table I above, the zero offset drift of 0.2 ml/(10 ms) can be observed in the idle time prior to the start of integration at time 0, which is when the dispense signal starts the dispense pump 110. Therefore, the dispense verification meter 120 can determine that there is a zero offset drift of 0.2 ml/(10 ms).

The dispense verification meter 120 may use the idle time between dispense operations to measure the idle flow rate and then use the measured drift value to compensate (or correct) for its effect on the calculated dispense volume. The dispense verification meter 120 may use the drift value to correct subsequently measure flow rate, and thereby more accurately measure the flow rate and the dispensed volume. The environmental effects that cause the zero offset drift are often long term and slow relative to the duration of the idle time and the dispense operation. Therefore, the drift that might take tens of minutes to occur, can be considered as a stable value for the period of a few seconds prior to a dispense operation or during the dispense operation. It follows that the environmental effects causing the zero offset drift during idle time (e.g., the initial idle phase) will have the same effect (or nearly the same effect) on the zero offset during the dispense operation immediately follow the idle time. Once the zero offset drift value has been estimated, the dispense verification meter 120 can compensate for the effect of the drift on subsequent dispense integration calculations, correct the integration result accordingly, and reach a more accurate estimate of the dispensed volume. For example, for the dispense operation measured in Table I, the dispense verification meter 120 can take the zero offset drift value (0.2 ml/(10 ms)) and multiply it by the number of measurements made during the dispense integration (33) to obtain an accumulated error value of 0.2*33=6.6 ml. Therefore, the dispense verification meter 120 calculates the corrected dispensed volume as 400 ml (406.6 ml−6.6 ml=400 ml).

Measurements are subject to noise, and the measured flow rate is no exception. In one embodiment, the dispense verification meter 120 reduces the impact of noise by taking multiple measurements during the idle period between dispense operations and calculating zero offset draft based on an average value of the idle flow rate measurements. As described above, environmental effects tend to cause the zero offset to drift slowly, and the drift between two dispense operations tends to remain fairly constant. Therefore, the larger the number of measurements that are included in the calculated average, the more the noise effect is diminished. For noises with a Gaussian distribution (a common situation), the improvement in the accuracy of the average scales as the square root of the number of measurements. For example, averaging 9 measurements reduces the effect of the noises to ⅓ (3=√9) and averaging 100 measurements reduces the effect to 1/10 (10=√100).

The duration of the idle period between dispense operations may be unknown to the dispense verification meter 120. The only signal that may be available to the dispense verification meter 120 is the dispense signal indicating the beginning of a dispense operation at which point it may be too late to measure the idle flow rate. To solve this problem, the dispense verification meter 120 may indiscriminately average all measurements made during the idle period. However, the idle period may be long, for example if the source vessel is empty and needs refilling. The zero offset may drift during such a long delay between dispenses. An average based on all idle flow rate measurements during the long delay would indiscriminately weight the earlier zero offset drift values. Because the calculated average is used to determine subsequent dispense operations, more recent zero offset drift values would be more representative. Described below are several approaches that take this into account.

(1) Ring Buffer Approach

Under this approach, the dispense verification meter 120 maintains a ring buffer (i.e., first in first out buffer) of idle flow rate measurements that is continuously updated. Thus, the ring buffer stores the N most recent flow rate measurements. The choice of N is application dependent. It is a tradeoff between the desire to average a large number of measurements to reduce noise effects, the desire to discard measurements that are too old and no longer representative of the current zero offset, and the additional cost (e.g., money, energy consumption) associated with more storage. For example if measurements were made once every 10 ms and the ring buffer is 100 elements long (N=100), the ring buffer would record one second's worth of idle flow rate measurements.

Initially, the ring buffer is empty. As the dispense verification meter 120 measures idle flow rate, it sequentially stores the measurements in the ring buffer. If the buffer is full, the dispense verification meter 120 overwrites the oldest (or earliest) measurements with the most recent ones. The ring buffer may include characteristics that are recorded together with the measurements such as whether a measurement is valid, whether a measurement was taken when measurement errors were detected, whether the ring buffer is full, and the location of the earliest measurement in the ring buffer.

Continuing with the above example (1 measurement per 10 ms, N=100), if the dispense verification meter 120 took 500 ms' worth of idle flow rate measurements, this would be 50 measurements which would fill the first 50 locations in the ring buffer. The last 50 locations would not contain valid data. On the other hand, if the dispense verification meter 120 took 1500 ms' worth of idle flow rate measurements, this would be 150 measurements. The most recent 50 measurements would overwrite the earliest 50. The 100 measurements in the ring buffer represent the 100 most recent measurements. The position in the ring buffer of the most recent measurement is in the 50th position and the oldest measurement is in the 51st position. The following formula summarizes one process for determining an average value ("Average1") under the ring buffer approach:

IF ring buffer has had at least 100 measurements written,

THEN Average1=SUM(most recent 100 measurements from ring buffer)/100

ELSE Average1=SUM(valid measurements in ring buffer)/(number of valid measurements in ring buffer)

(2) Delay Approach

In one embodiment, there is a consistent delay between the time when the dispense signal is sent to the dispense pump 110 to initiate a dispense operation, and the actual start of pumping. During this delay the flow rate is known to be zero and can therefore be used for zero offset drift averaging. The following formula summarizes the process for determining an average value ("Average2") under the delay approach:

Average2=SUM(measurements from dispense start signal to start of pumping)/(number of measurements)

(3) Repeated Ring Buffer Approach

Under this approach, the dispense verification meter 120 uses a block of measurements (e.g., the ring buffer) to repeatedly average the pre-dispense zero offset drift. Unlike the ring buffer approach, which cannot be calculated until the dispense verification meter 120 stops recording measurements in the ring buffer (e.g., at the start of dispense pumping or receiving dispense signal), a block average can be calculated on the fly in the following manner. During idle time between dispense operations, the dispense verification meter 120 records consecutive measurements in the ring buffer until the ring buffer is full. When the ring buffer becomes full, the dispense verification meter 120 calculates a block average and saves it as the most recent block average. The ring buffer is then reset and a new round of measurement and calculation starts. If the ring buffer is again full before the start of the dispense operation, the resulting average replaces the previous saved average as the most recent block average. When the dispense operation starts, the dispense verification meter 120 can either use the saved most recent block average as the zero offset drift or use the currently recorded measurements in the ring buffer (if any) and the most recent block average to calculate an improved average. For example, if 35 measurements are in the ring buffer with a capacity of N, the average ("Average3") can be calculated by the following formula:

Average3=((Existing Average3)*$N$+SUM(current 35 measurements))/(35+$N$)

(4) Repeated Accumulation Approach

Under this approach, the dispense verification meter 120 uses a block of measurements to repeatedly average the pre-dispense zero offset drift. The block average can be calculated on the fly in the following manner. During idle time between dispense operations, the dispense verification meter 120 accumulates consecutive measurements in an accumulator until a required number of measurements has been accumulated (N). When the accumulation is complete, the dispense verification meter 120 calculates a block average by dividing the accumulated value by the number of measurements in the accumulation (N), and saves it as the most recent block average. The accumulation is then reset and a new round of measurement and accumulation starts.

The following formula summarizes the process for determining an average value ("Average4") under the repeated accumulation approach:

Average4=SUM($N$ measurements prior to dispense start signal)/($N$)

If a subsequent accumulation process completes before the start of the dispense operation, the resulting average replaces the previous saved average as the most recent block average. When the dispense operation starts, the dispense verification meter 120 can either use the saved most recent block average as the zero offset drift or use the currently recorded measurements in the accumulator (if any) and the most recent block average to calculate an improved average. For example, if 35 measurements are in the accumulator, and an existing Average4 already has been calculated, then an improved Average4 can be calculated by the following formula:

Average4=((Existing Average4)*$N$+SUM(current 35 measurements))/(35+$N$)

In other embodiments, the dispense verification meter 120 may calculate a weighted average or exponential average of idle flow measurements, for example giving more weight to the flow rate measurements taken more recently. Alternatively, the dispense verification meter 120 may calculate a simple moving average, weighted moving average, or exponential moving average of a number of most recently measured flow rates.

In one embodiment, the dispense verification meter 120 does not measure the idle flow rate at a constant frequency (e.g., with the same time interval between measurements). The dispense verification meter 120 may increase the measurement frequency as the idle period lapses, such that more measurements are taken closer to the starting of the actual dispense phase.

Timing Scenarios

FIGS. 4A through 4D illustrate four examples of how trigger signals can be used to control when the dispense verification meter 120 can take flow rate measurements and idle flow rate measurements. Other timing scenarios are possible and would be obvious to one skilled in the art given these examples as a guide, and these four examples are given to illustrate by way of example, and not by way of limitation of timing scenarios.

Figure 4A:
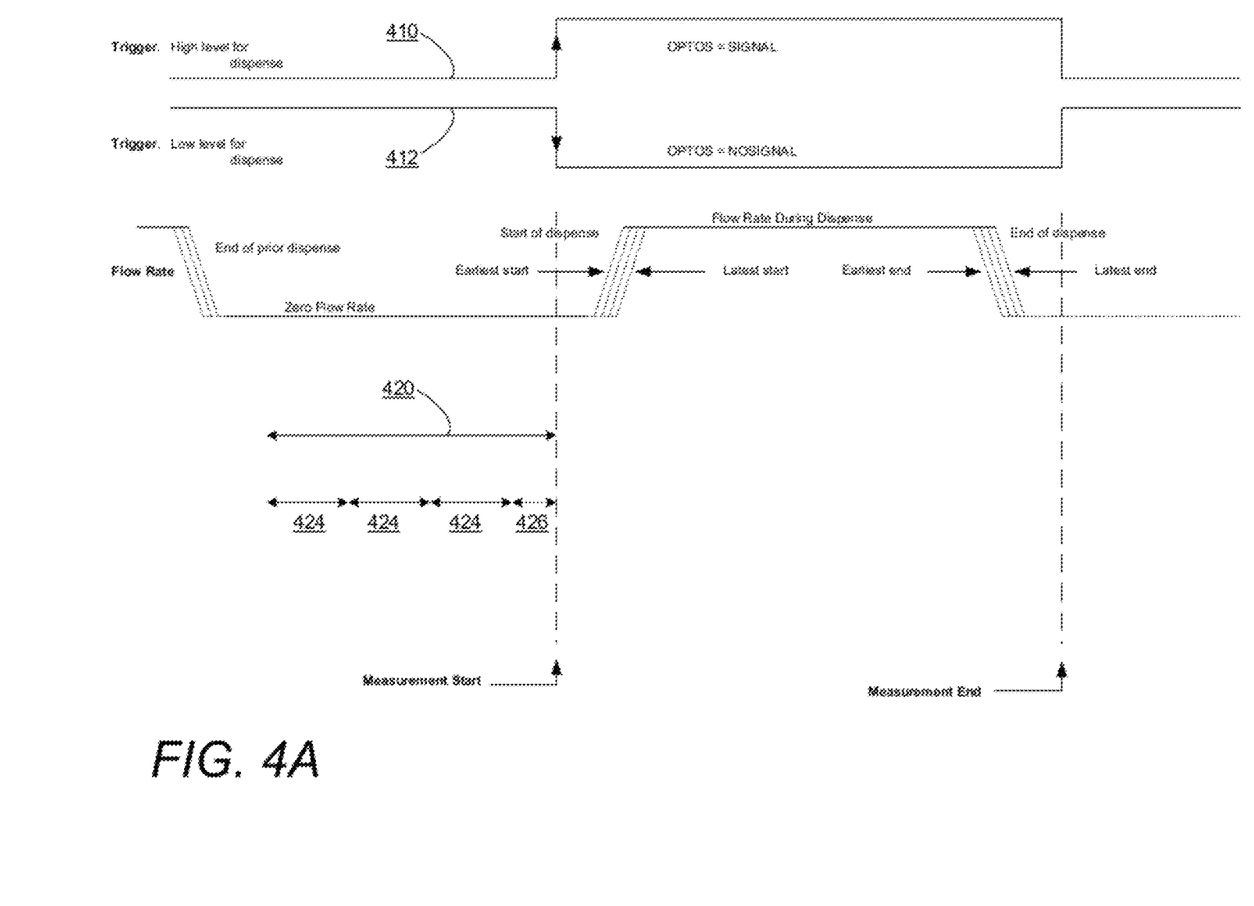
FIGS. 4A through 4D illustrate four dispense timing scenarios for a dispense verification meter to measure the flow rate for a dispense system according to one embodiment of the present disclosure.

In FIG. 4A, the level of the trigger signal 410, 412 (alternatives) indicates the occurrence of a dispense operation.

Using signal 410 as an example, the high level indicates the dispense phase. Active dispense occurs entirely within the time period when trigger signal 410 is high. Thus, active dispense starts after the trigger signal 410 transitions from low to high and ends before the trigger signal 410 transitions from high to low. Note that a different signal may be used to control the dispense pump 110. Trigger signal 412 behaves similarly, except that the low level indicates dispense phase.

In this approach, the dispense verification meter 120 makes flow rate measurements for the time period when the trigger signal is activated (e.g., high signal 410). For example, for signal 410, the dispense verification meter 120 measures flow rate to determine dispensed volume for the duration that the trigger signal 410 is at the high level.

The dispense verification meter 120 measures the idle flow rate when the signal 410 is at the low level prior to the low to high transition to determine a zero offset drift. The dispense verification meter 120 can measure the idle flow rate during the time period 420 and calculate an average (e.g., Average1) to estimate any zero offset drift. Alternatively (or in addition), the dispense verification meter 120 may measure idle flow rate during the time periods 424 and 426 and calculate an average (e.g., Average3 or Average4) following the repeated ring buffer approach or the repeated accumulation approach. Note that the time period 426 represents the random delay between the time when the most recent block average is calculated and when the dispense operation begins. In one embodiment, the duration of the time period 424 is selected to be less than half of the delay between two consecutive dispense operations, thus ensuring that at least one such block average will be completed between the end of one dispense cycle and the start of the next dispense cycle.

Figure 4B:
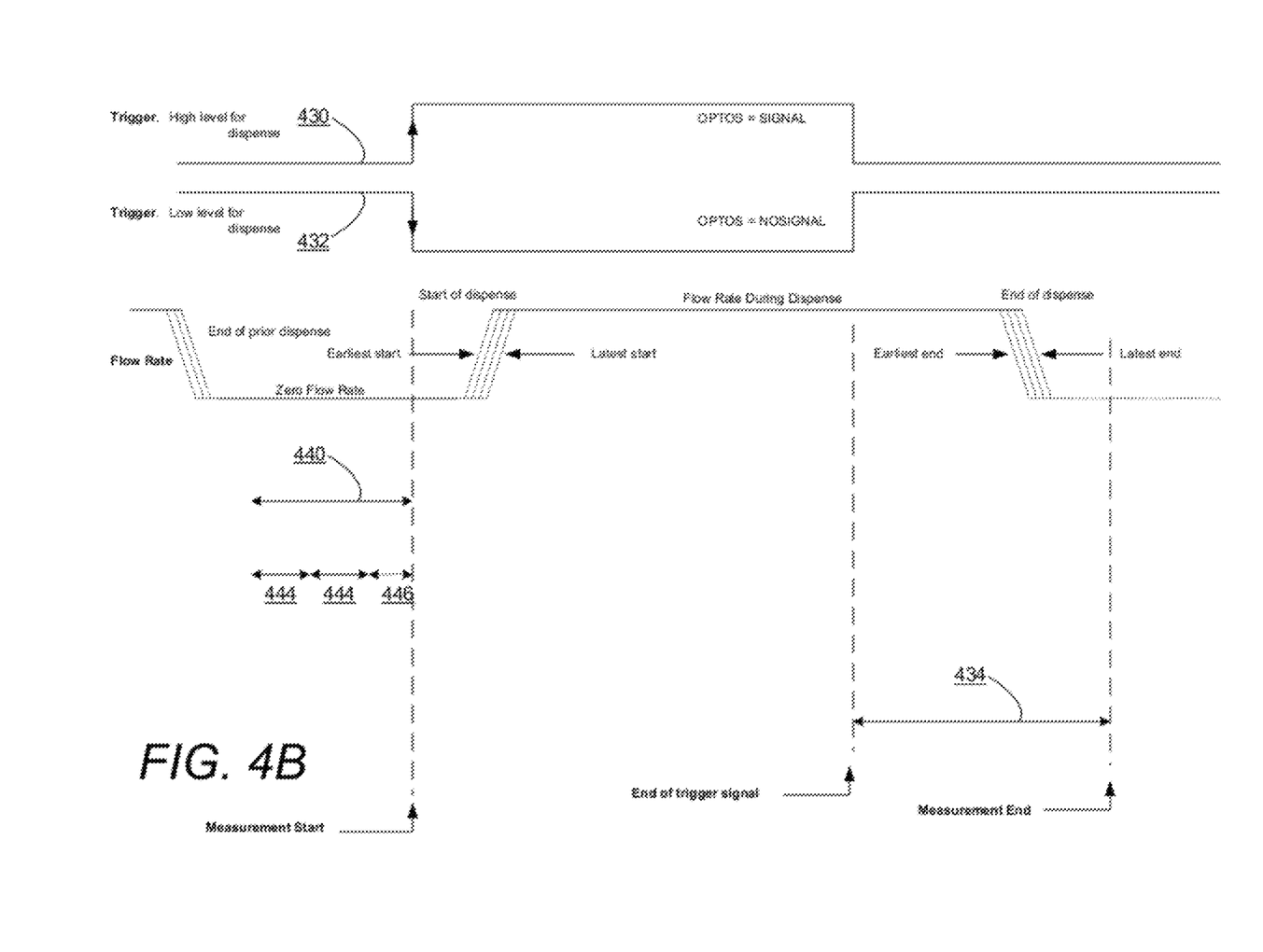

In FIG. 4B, the level of the trigger signal 430,432 indicates the occurrence of the dispense operation. While the dispense operation starts after the first transition as in the prior example of FIG. 4A, the dispense operation continues beyond the second transition (ending transition) of the trigger signal. Thus, active dispense starts only after trigger signal 430 transitions from low to high, and active dispense ends after the trigger signal 430 transitions from high to low but before an extra buffer period ends. For example, trigger signal 430 may be the same signal used to control the dispense pump 110, and the dispense pump 110 continues to run for some fixed duration after the trigger signal ends. As a result, an extra measurement period 434 is used.

In this approach, the dispense verification meter 120 makes flow rate measurements for the time period when the trigger signal is activated (e.g., high signal 430) plus for the additional measurement period 434. For example, for the trigger 430, the dispense verification meter 120 measures flow rate for purposes of calculating dispensed volume during the time period when the trigger signal 430 is high level and then also for the additional measurement period 434. The dispense verification meter 120 can measure idle flow rate during the rest of the time to determine a zero offset drift. Similar to the scenario in FIG. 4A, the dispense verification meter 120 can measure idle flow rate during the time period 440 and calculate an average (Average1) following the ring buffer approach, and/or measure idle flow rate during the time periods 444 and 446 and calculate an average (e.g., Average3 or Average4) following the repeated ring buffer approach or the repeated accumulation approach.

Figure 4C:
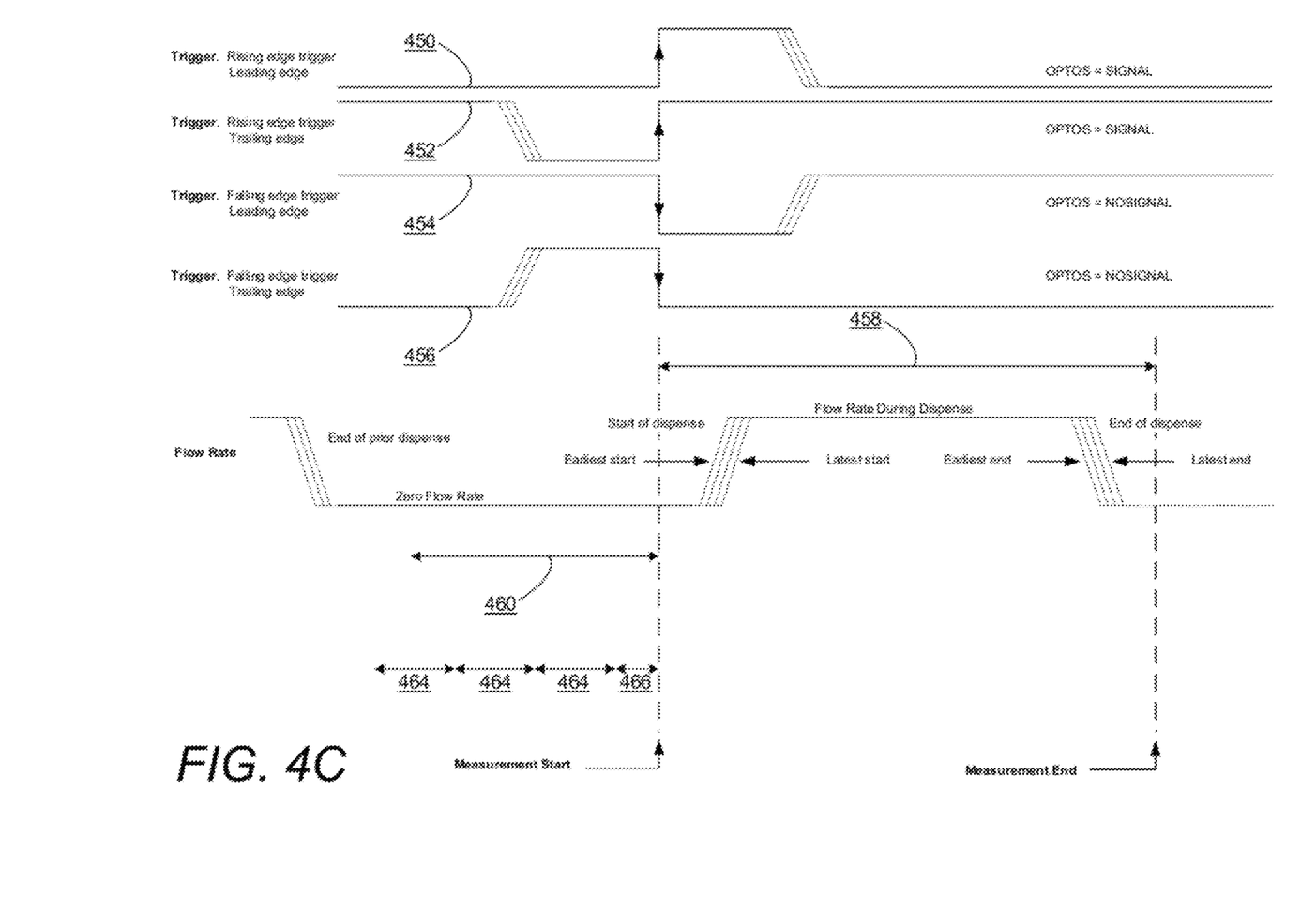

In FIG. 4C, a transition in the trigger signal 450, 452, 454, 456 indicates the beginning of a dispense operation, which then lasts for a predetermined duration 458. For example, in trigger signal 450, a rising edge indicates the beginning of a dispense operation, and trigger signal 450 quickly returns to its low level where it stays for most of the time. In trigger signal 452, a rising edge also indicates the beginning of a dispense operation but this signal 452 stays at a high level for most of the time. Triggering is therefore a response to a low to high transition, and is independent of whether the signal is predominantly low or high. Signals 454,456 show examples where a falling edge indicates the beginning of a dispense operation.

In this scenario, the dispense verification meter 120 makes flow rate measurements for the time period beginning when the trigger signal makes the required transition and lasting for the duration 458. The dispense verification meter 120 can measure idle flow rate at other times.

Figure 4D:
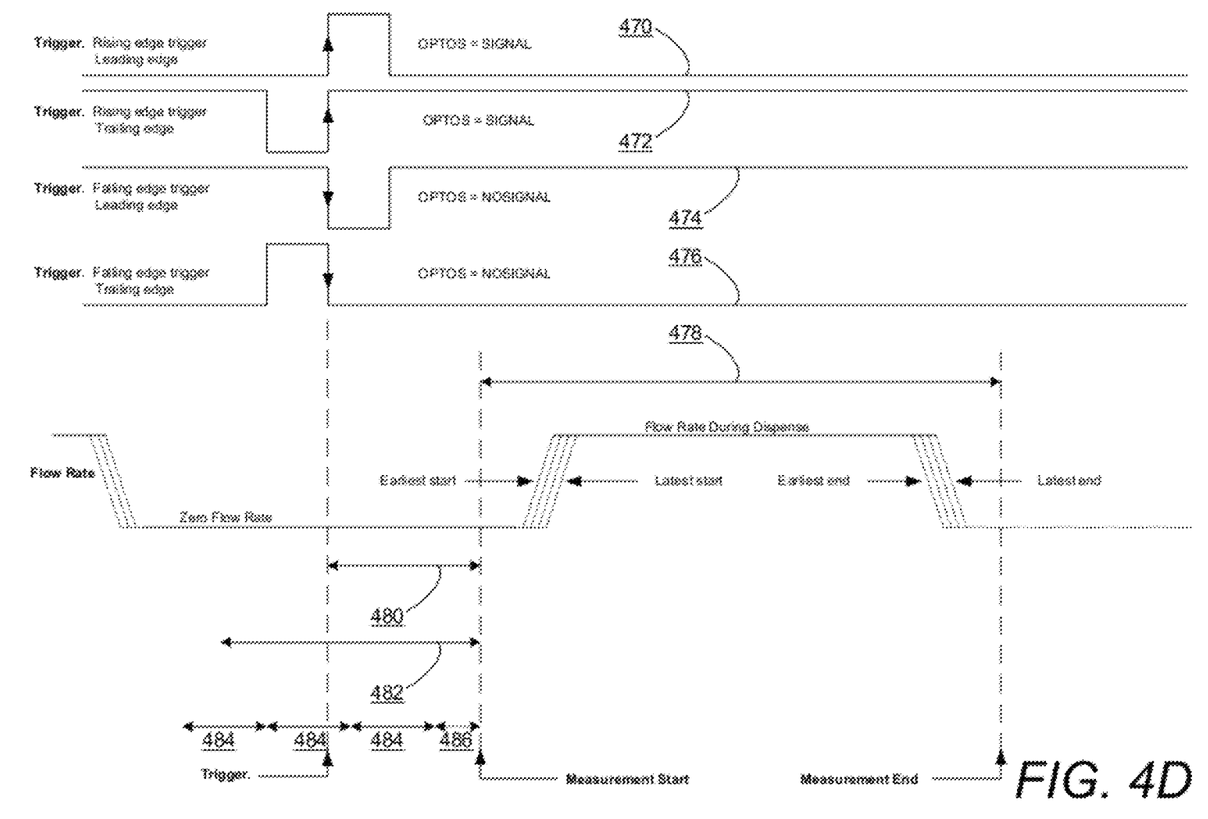

FIG. 4D is similar to FIG. 4C in that a particular transition in triggers 470, 472, 474, 476 indicates the beginning of a dispense operation. The indicating level changes in the triggers 470, 472, 474, 476 are leading rising edge, trailing rising edge, leading falling edge, and trailing falling edge, accordingly. Unlike the scenarios in FIGS. 4A-4C, there is a fixed delay 480 between the transition and the beginning of the dispense operation. Similar to FIG. 4C, the duration of the dispense operation is indicated by a duration 478.

In this scenario, the dispense verification meter 120 makes flow rate measurements for the time period 478. The dispense verification meter 120 can measure idle flow rate at other times, including during time period 480.

Dispense Verification Meter Operation

Figure 5:
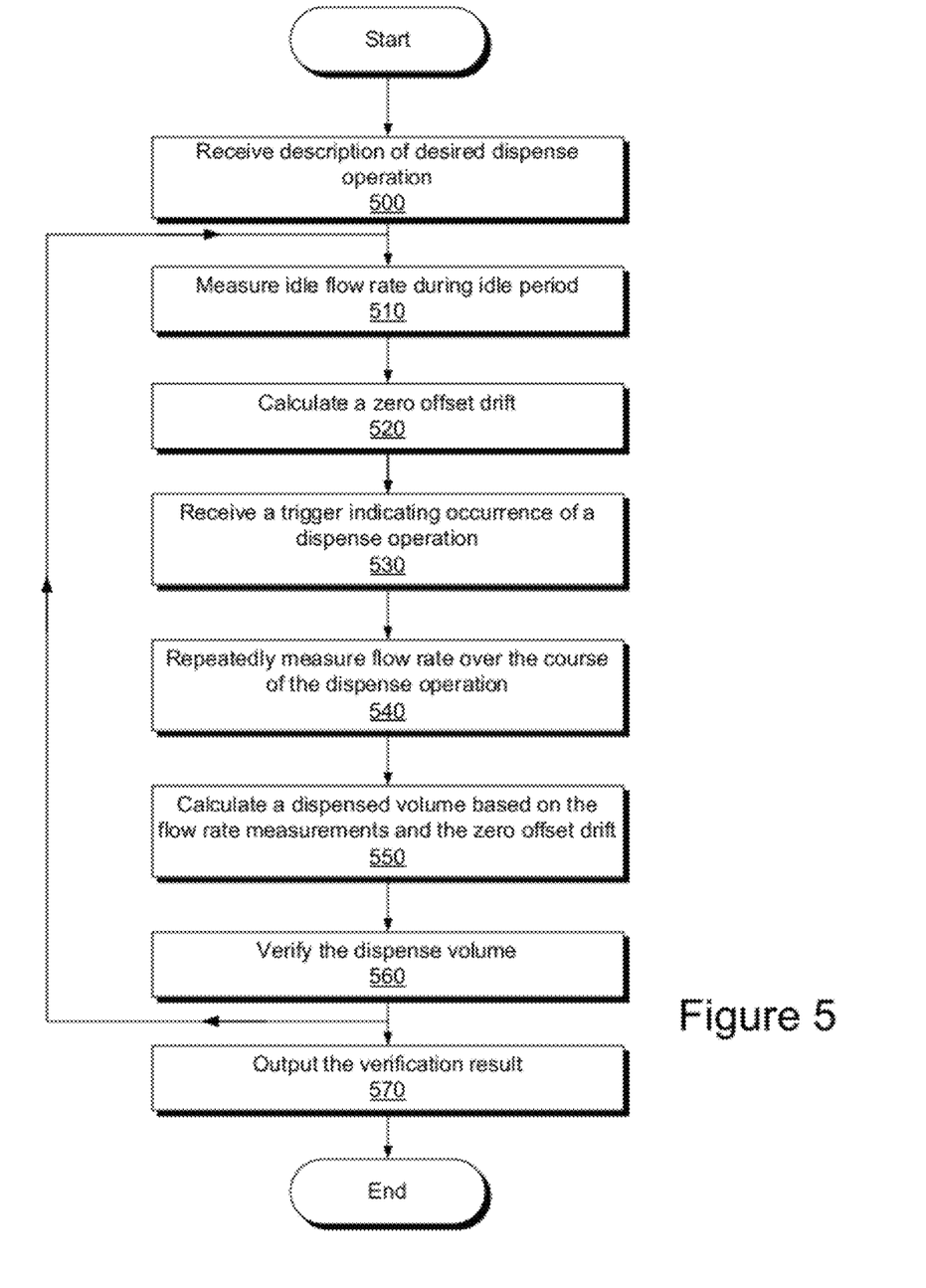
FIG. 5 is a flowchart illustrating a method for a dispense verification meter to correct zero offset drift, to measure, and to verify dispense operations of a dispense system according to one embodiment of the present disclosure.

FIG. 5 is a flowchart illustrating one embodiment of a method for the dispense verification meter 120 to correct zero offset drift and verify dispensed volume. One or more portions of the method may be implemented in embodiments of hardware and/or software or combinations thereof. For example, the method may be embodied through instructions for performing the actions described herein and such instrumentations can be stored within a tangible computer readable medium (e.g., read-only memory), and are executable by a computer processor or an embedded processor. Furthermore, those of skill in the art will recognize that other embodiments can perform the steps of the method in different order. Moreover, other embodiments can include different and/or additional steps than the ones described here.

Initially, the dispense verification meter 120 receives 500 a description of the desired dispense operation. For example, it may receive minimum and maximum acceptable dispensed volumes, it may receive time periods 434, 458, 480 and 478 as shown in FIGS. 4A-4D, and/or it may receive the time period between dispense operations. The dispense verification meter 120 measures 510 the idle flow rate during the idle period between dispense operations. Because there is no flow during the idle period, these measurements can be used to estimate a zero offset drift. The dispense verification meter 120 calculates 520 a zero offset drift based on the idle flow rate measurements. The dispense verification meter 120 may use a recent measurement as the zero offset drift, or calculate an average of the measurements.

The dispense verification meter 120 receives 530 a trigger indicating the occurrence of a dispense operation. As shown in FIGS. 4A-4D, different types of triggers can be used and different timing scenarios may be used, depending on the actual application. Active dispense may start immediately after the trigger or after a delay. The dispense verification meter 120 repeatedly measures 540 flow rates of the dispensed media over the course of the dispense operation. Because the flow rate changes continuously during a dispense operation, the dispense verification meter 120 preferably samples the flow rate at short enough time intervals to accurately capture flow rate deviations. The flow rate can be sampled at time intervals different than those used to sample the idle flow rate.

The dispense verification meter 120 calculates 550 a dispensed volume based on the flow rate measurements taken over the course of the dispense operation and also based on the calculated zero offset drift. In one embodiment, the dispense verification meter 120 offsets each flow rate measurement by the zero offset drift to obtain the adjusted flow rate, and then numerically integrates 550 these numbers to calculate the dispensed volume.

The dispense verification meter 120 verifies 560 the dispensed volume by comparing it with the received 500 description. For example, the dispense verification meter 120 may receive from the control system 130 a permissible range for the dispensed volume, defined by a minimum dispensed volume and maximum dispensed volume. The dispense verification meter 120 compares 560 the calculated dispensed volume with the minimum and maximum values. If the calculated dispensed volume falls within the permissible range, the dispense verification meter 120 successfully verifies 560 the dispense operation. Otherwise, the verification 560 fails.

The dispense verification meter 120 outputs 570 the measured flow rates, the calculated results (e.g., dispensed volume and zero offset drift) and/or the verification result. The output can be in any format, such as an audio/video/vibration alarm (e.g., for failed verification), a control signal (e.g., to the control system 130 to invalidate the previous dispense operation), a data message (e.g., to a database for recordation or to an administrator). The dispense verification meter 120 can also send out other messages based on the calculated zero offset drift. For example, if the zero offset drift is over a certain threshold, the dispense verification meter 120 can output a report and/or alarm, notifying that the working environment of the dispense system should be adjusted and/or components of the dispense system should be replaced (e.g., replacing the dispense pump 110 or valve).

The dispense verification meter 120 can repeat the process by measuring 510 the idle flow rate during the idle period after the verified dispense operation and conducting the subsequent steps for the upcoming dispense operation.

It is noted that the dispense operation verification mechanism (or functionality) and the zero offset drift correction mechanism (or functionality) are distinct mechanisms. A dispense meter may implement either one or both of the two mechanisms. For example, the dispense verification meter 120 may verify dispense operations without implementing or utilizing the zero offset drift correction mechanism.

Alternative Embodiments

In one embodiment, instead of or in addition to measuring the idle flow rate before a dispense operation to determine a zero offset drift, the dispense verification meter 120 can measure the idle flow rate after the dispense operation.

In one embodiment, the dispense verification meter 120 does not use triggers indicating the starting and/or ending of dispense operations. The dispense verification meter 120 uses the past measurement data to determine the starting time and duration for future dispense operations (e.g., using machine learning algorithms).

In one embodiment, the dispense verification meter 120 is used in a feedback path of the dispense system 100 to affect the active dispense by the dispense pump 110. For example, if the dispense verification meter 120 indicates that the dispense pump 110 is delivering more than the desired amount, then the difference between the desired dispensed volume and the measured dispensed volume can be used to adjust the active dispense by the dispense pump 110. Alternately, just the fact that too much media was dispensed or that there was a failed verification could be used as feedback to control the dispense pump 110.

In one embodiment, the dispense system 100 can have other sensors, such as a temperature sensor, such that the control system 130 can report and/or control the measured environmental factors (e.g., temperature) accordingly.

In one embodiment, the dispense verification meter 120 is used for measuring and verifying dispense operations of fluid (e.g., liquid, semisolid, and sludge) and slurry (e.g., watery mixtures of insoluble matter). In other embodiments, the dispense verification meter 120 can be used for measuring and verifying dispense operations of other media such as gas and solid.

The disclosed dispense verification meter 120 provides accurate measurement and verification for media dispense systems. The dispense verification meter 120 advantageously has the capacity to automatically correct zero offset drift, and improves its accuracy in media dispense measurement and verification. Because the calculation of the dispensed volume and the zero offset drift is conducted in the dispense verification meter 120, they can be achieved more rapidly and accurately. Because the accurate verification can lead to better control of the dispense system, the dispense verification meter 120 can also lead to more accurate dispense of media.

In the preceding description, for purposes of explanation, numerous specific details are set forth in order to provide a thorough understanding of the disclosure. It will be apparent, however, to one skilled in the art that the disclosure can be practiced without these specific details. In other instances, structures and devices are shown in block diagram form in order to avoid obscuring the disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

The present disclosure also relates to an apparatus for performing the operations herein. This apparatus is specially constructed for the required purposes (such as an embedded processor), or it comprises a general-purpose computer selectively activated or reconfigured by a computer program stored in the computer. Such a computer program is stored in a computer readable storage medium, such as, but not limited to, any type of disk including floppy disks, optical disks, CD ROMs, and magnetic-optical disks, read-only memories (ROMs), random access memories (RAMs), EPROMs, EEPROMs, FLASH, magnetic or optical cards, or any type of media suitable for storing electronic instructions, and each coupled to a computer or embedded processor system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems appears in the description herein. In addition, the present disclosure is not described with reference to any particular programming language. It will be appreciated that a variety of programming languages may be used to implement the teachings of the disclosure as described herein.

What is claimed is:

1. A dispense system, comprising:
   a media dispense line;
   a dispense pump connected to the media dispense line, the dispense pump pumping a media through the media dispense line;
   a dispense verification meter connected to the media dispense line, the dispense verification meter configured to:
      receive a descriptor for a desired dispense operation; responsive to a trigger signal indicating an occurrence of a dispense operation, measure flow rates of the media multiple times over the course of the dispense operation; measure an idle flow rate of the media one or more times during an idle period between dispense operations; calculate a dispensed volume of the media based on the multiple flow rate measurements and the idle flow rate measurement(s); and verify the dispense operation based on the calculated dispensed volume; and
   a control system communicatively coupled to the dispense pump and the dispense verification meter, the control system configured to receive verification from the dispense verification meter, and also configured to control the dispense pump.

2. The dispense system of claim 1, wherein the dispense verification meter calculates the dispensed volume of the media by:
   calculating a zero offset drift based on the idle flow rate measurement(s); and
   numerically integrating the multiple flow rate measurements, taking into account the calculated zero offset drift.

3. The dispense system of claim 2, wherein the dispense verification meter numerically integrates the multiple flow rate measurements by:
   for each flow rate measurement taken over the course of the dispense operation, calculating an adjusted flow rate measurement by offsetting the zero offset drift; and
   numerically integrating the multiple adjusted flow rate measurements.

4. The dispense system of claim 2, wherein the dispense verification meter calculates the zero offset drift by:
   measuring the idle flow rate multiple times during the idle period; and
   calculating the zero offset drift based on an average of the idle flow rate measurements.

5. The dispense system of claim 4, wherein the average of the idle flow rate measurements is an average of idle flow rates measured since the end of the immediately previous dispense operation.

6. The dispense system of claim 4, wherein the dispense verification meter measures the idle flow rate multiple times after receiving the trigger signal but before starting dispense of the media.

7. The dispense system of claim 1, wherein the control system sends the descriptor to the dispense verification meter.

8. The dispense system of claim 1, wherein the trigger signal indicates that dispense of the media will start after a predetermined delay.

9. The dispense system of claim 1, wherein the dispense verification meter measures flow rates of the media over the course of the dispense operation by taking flow rate measurements at a frequency that is higher than a sampling frequency of the dispense operation.

10. The dispense system of claim 1, wherein:
    the desired dispensed volume defined by the descriptor includes a minimum desired dispensed volume and a maximum desired dispensed volume; and
    the dispense verification meter verifies the dispense operation by determining whether the calculated dispensed volume is between the minimum desired dispensed volume and the maximum desired dispensed volume, and if the calculated volume is not between the minimum desired dispensed volume and the maximum desired dispensed volume, issuing an alarm signal indicating a failed verification.

11. The dispense system of claim 1, wherein the dispense verification meter transmits a verification result indicating either a successful or failed verification.

12. The dispense system of claim 1, wherein the control system adjusts a subsequent dispense operation based on the calculated dispensed volume compared to the desired dispensed volume defined by the received descriptor for the desired dispense operation.

13. The dispense system of claim 1, wherein the control system adjusts a subsequent dispense operation based on the success or failure of the verification.

14. A dispense verification meter comprising:
    a flowmeter that measure a flow rate of a media through a media dispense line to which the dispense verification meter is connected; and
    an embedded controller communicatively coupled to the flowmeter, the embedded controller receiving a descriptor for a desired dispense operation; responsive to a trigger signal indicating an occurrence of a dispense operation, controlling the flowmeter to measure flow rates of the media through the media dispense line multiple times over the course of a dispense operation and measuring an idle flow rate through the media dispense line during an idle period between dispense operations; calculating a dispensed volume of the media based on the multiple flow rate measurements and on the idle flow rate measurement(s); and verifying the dispense operation based on the calculated dispensed volume and the received descriptor.

15. The dispense verification meter of claim 14, wherein the calculating by the embedded controller of the dispensed volume of the media comprises:
    calculating a zero offset drift based on the idle flow rate measurement(s); and
    numerically integrating the multiple flow rate measurements, taking into account the calculated zero offset drift.

16. The dispense verification meter of claim 15, wherein the numerically integrating the multiple flow rate measurements comprises:
    for each flow rate measurement taken over the course of the dispense operation, calculating an adjusted flow rate measurement by offsetting the zero offset drift; and
    numerically integrating the multiple adjusted flow rate measurements.

17. The dispense system of claim 15, wherein calculating the zero offset drift comprises:
    measuring the idle flow rate multiple times during the idle period; and
    calculating the zero offset drift based on an average of the idle flow rate measurements.

18. A computer program product for a dispense verification meter to verify a dispense operation, the computer program product comprising a computer-readable medium containing computer program code for performing a method comprising:

receiving a descriptor for a desired dispense operation;
responsive to a trigger signal indicating an occurrence of a dispense operation, measuring flow rates of a media to be dispensed multiple times over the course of the dispense operation, and further measuring an idle flow rate during an idle period between dispense operations;
calculating a dispensed volume of the media based on the multiple flow rate measurements and the idle flow rate measurement(s); and
verifying the dispense operation based on the calculated dispensed volume and the received descriptor.

19. The dispense verification meter of claim 18, wherein calculating the dispensed volume of the media comprises:
calculating a zero offset drift based on the idle flow rate measurement(s); and
numerically integrating the multiple flow rate measurements, taking into account the calculated zero offset drift.

20. The dispense verification meter of claim 19, wherein the numerically integrating the multiple flow rate measurements comprises:
for each flow rate measurement taken over the course of the dispense operation, calculating an adjusted flow rate measurement by offsetting the zero offset drift; and
numerically integrating the multiple adjusted flow rate measurements.

* * * * *